INVENTOR
RICHARD L. CAPELL
BY
ATTORNEYS

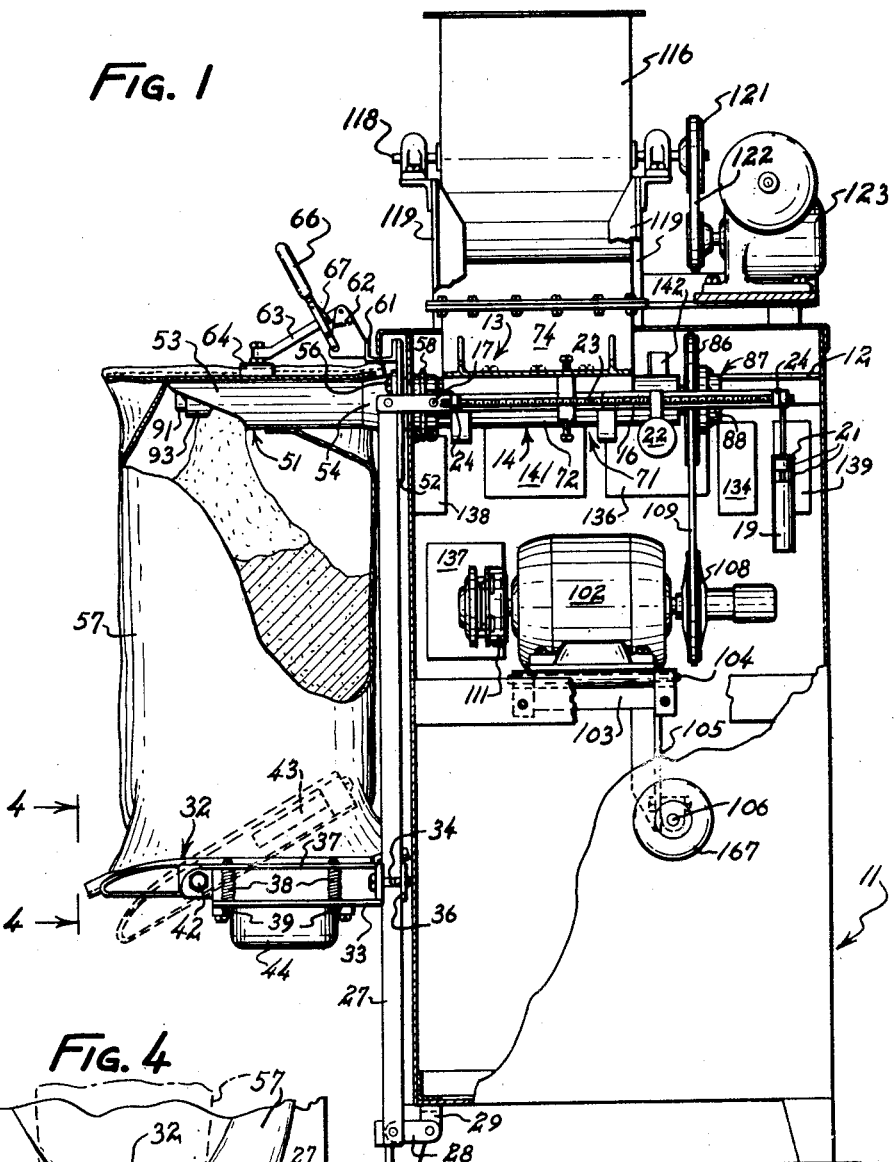
Dec. 24, 1957 R. L. CAPELL 2,817,488
BAG FILLING AND WEIGHING APPARATUS
Filed May 11, 1955 4 Sheets-Sheet 1
INVENTOR
RICHARD L. CAPELL
ATTORNEYS Dec. 24, 1957   R. L. CAPELL   2,817,488
BAG FILLING AND WEIGHING APPARATUS
Filed May 11, 1955   4 Sheets-Sheet 2

Dec. 24, 1957    R. L. CAPELL    2,817,488
BAG FILLING AND WEIGHING APPARATUS
Filed May 11, 1955    4 Sheets-Sheet 3

INVENTOR
RICHARD L. CAPELL
BY
ATTORNEYS

Dec. 24, 1957 R. L. CAPELL 2,817,488
BAG FILLING AND WEIGHING APPARATUS
Filed May 11, 1955 4 Sheets-Sheet 4

INVENTOR
RICHARD L. CAPELL
BY
ATTORNEYS

United States Patent Office 2,817,488
Patented Dec. 24, 1957

2,817,488

BAG FILLING AND WEIGHING APPARATUS

Richard L. Capell, San Francisco, Calif., assignor to Du Bell Enterprises, Inc., San Francisco, Calif., a corporation of California Application May 11, 1955, Serial No. 507,629

15 Claims. (Cl. 249—63)

This invention relates generally to bag filling and particularly to filling and weighing apparatus for filling bags of the valve type with granular and finely divided materials such as insecticides, fertilizers, chemicals, minerals, diatomaceous earths and other similar materials.

In packaging finely divided materials such as those mentioned above, it is desirable to place a predetermined quantity of material in each of a plurality of bags with a minimum weight variation between bags. In the past, bag filling and weighing apparatus of this type has been unduly expensive and often inaccurate. In particular, some of the weighing mechanisms have been sluggish in operation and the feeding mechanisms for filling the bags have been difficult to control so that no more than the predetermined quantity of the material is fed into the bag.

In general it is an object of the present invention to provide bag filling and weighing apparatus which will place a predetermined quantity of finely divided material into bags with minimum weight variation between bags.

Another object of the invention is to provide bag filling and weighing apparatus of the above character having an improved scale mechanism.

Another object of the invention is to provide a bag filling and weighing apparatus of the above character having improved means for reducing spillage and flushing of the finely divided material.

Another object of the invention is to provide a bag filling and weighing apparatus of the above character in which the feed mechanism accommodates the pivotal movement of the scale mechanism.

A further object of the invention is to provide a bag filling and weighing apparatus of the above character having a tilting and vertically adjustable bag saddle.

Additional objects and features of the invention will appear from the following description in which the preferred embodiment has been set forth in detail in conjunction with the accompanying drawing.

Referring to the drawing:

Figure 1 is a side elevation view partly in cross section with certain portions of the cabinet broken away showing a bag filling and weighing apparatus embodying my invention.

Figure 4 is an enlarged detail view of the bag saddle taken along line 4—4 of Figure 1.

Figures 2, 7, 8:
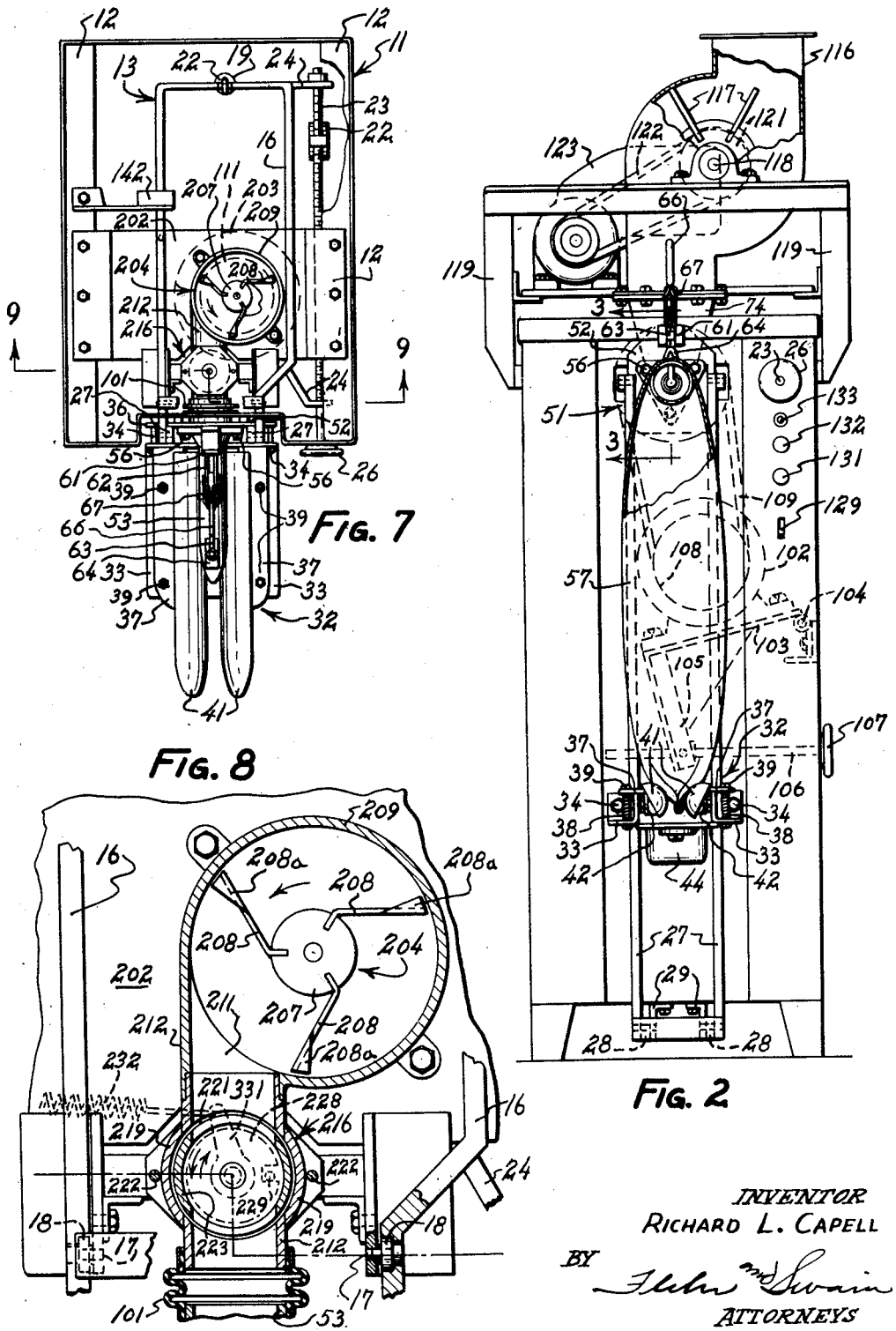
Figure 2 is a front elevation view of the bag filling and weighing apparatus shown in Figure 1.
Figure 7 is a plan view of my apparatus shown in Figure 6 with the cover removed.
Figure 8 is an enlarged detail view of the impeller and valve assembly as shown in Figure 7.
Figure 6:
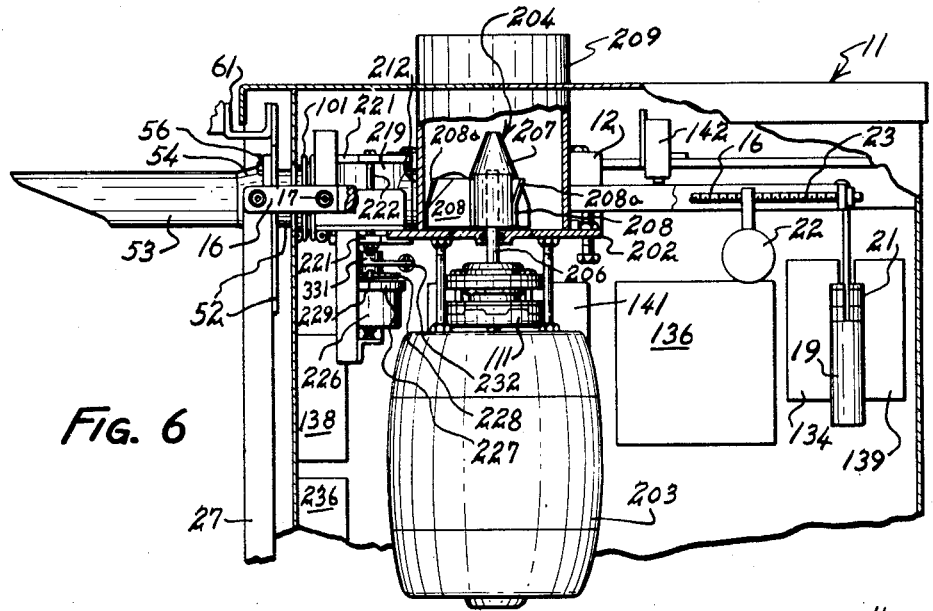
Figure 6 is a side elevation view partly in cross section and with certain portions of the cabinet broken away showing a bag filling and weighing apparatus incorporating another embodiment of my invention.
Figure 9:
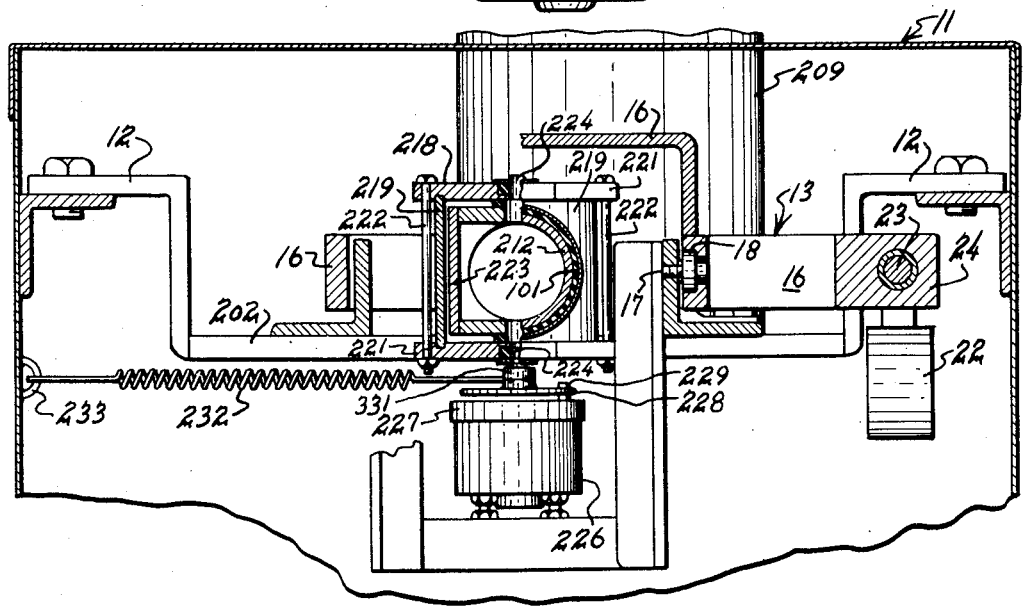
Figure 9 is a detail view of the valve assembly taken along the line 9—9 of Figure 7.

In the embodiment of my invention shown in the drawing, I have provided a cabinet or housing shown generally at 11 for supporting and enclosing the various operating assemblies. A framework 12 is secured to the upper portion of the housing 11 by suitable means such as welding and provides a support for a scale assembly 13 and a feeding means 14. The scale beam 16 of the scale assembly has the form and configuration generally shown in Figure 7 and is pivotally mounted on a framework 12 at 17 by suitable means such as dust tight sealed ball bearing assemblies 18. A counterbalance 19, including a plurality of poises 21, is hung on the rear end of scale frame 16. A trim weight 22 is adapted to be moved longitudinally of scale beam 16 by means of a threaded rod 23 which is mounted adjacent one side of the scale beam by means of lugs 24. The threaded rod extends through the front wall of cabinet 11 and is adapted to be operated by a hand wheel 26.

The forward portion of the scale beam 16 is pivotally connected to a pair of vertical bars 27 adjacent the front side of the cabinet which have their lower ends pivotally connected to links 28 which are pivotally connected to lugs 29 fixed to the bottom of the cabinet.

A bag saddle assembly 32 is slidably mounted on bars 27 and consists of a U-shaped bag saddle frame 33 which is clamped to one side of bars 27 by suitable means such as bolts 34 which are threaded into a plate 36 on the opposite side of the bars. A pair of L-shaped members 37 are supported upon the bag saddle frame 33 by springs 38 mounted on bolts 39. A pair of saddle shoes 41 are pivotally connected near their front ends to the L-shaped members by bolts 42. The saddle shoes are spaced to accommodate the bottom of a bag and are rounded on their front ends. A counterweight 43 is fixed in the end of each of the saddle shoes to normally hold the saddle shoes in a horizontal position.

If necessary, a suitable vibrator assembly 44 such as one manufactured by Syntron of Homer City, Pennsylvania may be secured to the bag saddle frame 33 for a purpose hereinafter described.

Adjacent the upper ends of the bars 27 I have provided a spout assembly 51 which consists of a plate 52 which is fixed to the bars by a suitable means such as welding. A spout 53 extends through an opening in plate 52 and is held in position by a collar 54 which is secured to plate 52 by bolts 56. The spout is provided with a tapered front end as shown in Figure 1 which is adapted to be inserted in a bag of the valve type such as is shown at 57. Bags of this type are sewn at the opposite ends and are provided with valves in one side of the bags, the valves being subsequently inserted or folded to seal the bag after the bag has been filled.

The rear end of spout 53 is connected to the feeding means 14 by a suitable flexible connection such as a flexible coupling 58.

Means may be provided for securing the bag to the spout while the bag is being filled. One means found to be satisfactory consists of a U-shaped member 61 fixed to plate 52. A plate 62 is fixed to member 61 and provides a pivotal mounting for one end of an arm 63. The other end of arm 63 is provided with a V-shaped member 64 which is adapted to fit over the top of the bag and hold it securely against the spout. The crank holds member 64 in a bag engaging position by means of a lever 66 which has its lower end pivotally connected to plate 62. A link 67 has one end pivotally connected to arm 63 and the other end pivotally connected to an intermediate portion of lever 66 to provide a toggle mechanism whereby when link 67 is pivoted off center (as shown in Figure 1), it will lock the V-shaped member into a bag engaging position.

As described to this point, the different embodiments of my invention shown in Figures 1 to 9 are identical. The remainder of the embodiment of my invention shown in Figures 1 through 5 will now be described in detail. This embodiment of my invention may be referred to generally as a screw type bag filling and weighing apparatus and consists of a screw assembly 71 disposed longitudinally within the upper portion of the cabinet 11.

The screw assembly consists of a casing 72 which surrounds the feed screw 73. The casing is provided with an opening in its upper portion which is connected to a chute 74 for delivering material to the feed screw. The feed screw 73 consists of a shaft 76 which extends through the length of the casing 72 and into spout 53 and a helical flight 77 which moves the material through the casing as the shaft is rotated. The rear portion of the flight is in the form of a single helix whereas the front portion of the worm is in the shape of a double helix for a purpose hereinafter described. The diameter of the feed screw may be increased or decreased to adapt our apparatus to handle different types of materials. The flights may be a single or double helix or may have an increasing or decreasing pitch.

The rear end of shaft 76 is loosely journalled within a mounting block 81 carried by casing 72. An oil seal 82 prevents material from passing out of the casing along shaft 76. The inner race of a ball bearing assembly 83 is fixed to an extension 84 of mounting block 81. The outer race of the ball bearing assembly 83 is fixed to a sheave 86 which rotates about shaft 76. Sheave 86 is flexibly connected to shaft 76 by suitable means such as a gear coupling 87 manufactured by the Philadelphia Gear Works of Philadelphia, Pennsylvania. The outer gear 88 of gear coupling 87 is fastened to sheave 86 whereas the inner gear 89 is fixed to shaft 76. It is well known to those skilled in the art that gear couplings of this type are self aligning and will allow shaft deflections of 7° or more.

The forward end of shaft 76 is flexibly connected to the forward end of spout 53 by suitable means such as a bearing pin 91 which is fixed to the spout. The inner race of a self aligning ball bearing assembly 92 is fixed to bearing pin 91 and the outer race of the ball bearing assembly is carried within a cup-shaped member 93 mounted on the forward end of shaft 76. A dust tight seal is formed for the ball bearing assembly 92 by means consisting of a spacer 94 adjacent the ball bearing assembly, an oil seal 96 adjacent the spacer, a fiber disk 97 adjacent the oil seal and a snap ring 98 holding the sealing means in place.

Since the front end of shaft 76 is journalled in a self aligning bearing assembly and the rear end is journalled in a gear coupling, it is apparent that shaft 76 is pivoted about the gear coupling when spout 53 moves downwardly with the weighing mechanism as the bag is filled as hereinafter described.

Any suitable means may be provided for driving feed screw 73. One means that I have found to be satisfactory consists of an electric motor 102 which is mounted on a platform 103 having one end pivotally connected to the cabinet at 104. The lower end 105 of the platform 103 is connected to a threaded rod 106 adapted to be rotated by a hand wheel 107 to cause raising and lowering of the platform for a purpose hereinafter described.

One output shaft of the motor 102 has been fitted with a spring loaded variable speed pulley 108 of the type in which the rims of the pulley are continuously urged toward each other by spring means (not shown) to engage a V-belt 109 driving sheave 86. It is apparent that as the motor 102 is lowered away from sheave 86 that V-belt 109 will urge the rims of the pulley apart and will contact the pulley on a smaller diameter to make up for the increased distance between the pulley and the sheave which will decrease the speed with which the feed screw is rotated. As the motor is raised by rotation of hand wheel 107, the V-belt 109 will move toward the outer circumference of the pulley to cause the feed screw to rotate at a greater speed.

An electrically operated brake 111 of the disk type has been provided on the other output shaft of motor 102 to brake the motor and stop rotation of feed screw 73 when motor 102 is deenergized.

Suitable feed control means may be provided to prevent material from bridging in chute 74. One feed control means found to be satisfactory consists of housing 116 having its lower end fastened to the top end of chute 74 and its upper end fastened to a hopper or the like device (not shown). A paddle wheel 117 is mounted within the housing on a shaft 118 which has its opposite ends extending through the side walls of the housing and journalled onto a framework 119 fastened to the top of the cabinet 11. One end of shaft 118 is provided with a pulley 121 which is rotated by a belt 122 driven by gear motor 123 which is mounted on framework 119. It is apparent that the rate of feed of material to feed screw 73 can be regulated by adjusting the speed of rotation of the paddle wheel 117 so that at no time will large masses of material be fed into chute 74 to cause bridging of the material within the chute.

As a part of the electrical circuit means employed, I have provided an on-off switch 129, a pair of indicating lights 131 and 132 and a push button 133 on the front panel of the cabinet 11. Within the cabinet mounted on one of the side walls, I have provided a vibrator control assembly 134, a motor control assembly 136, a motor control assembly 137, a step down transformer 138, a relay assembly 139, a brake control assembly 141, and a switch 142 of the "microswitch" type, all connected in a manner hereinafter described. Switch 142 is mounted on the framework 12 and is adapted to be operated by movement of scale beam 16.

The motor control assembly 136 has been provided with a plurality of contacts 1 through 6 and a start coil 144. Motor control assembly 137 has been provided with a similar set of contacts 1 through 6 and a start coil 146. Relay assembly 139 has been provided with a plurality of contacts 1 through 6, a start coil 147, and a stop coil 148.

Figure 3:
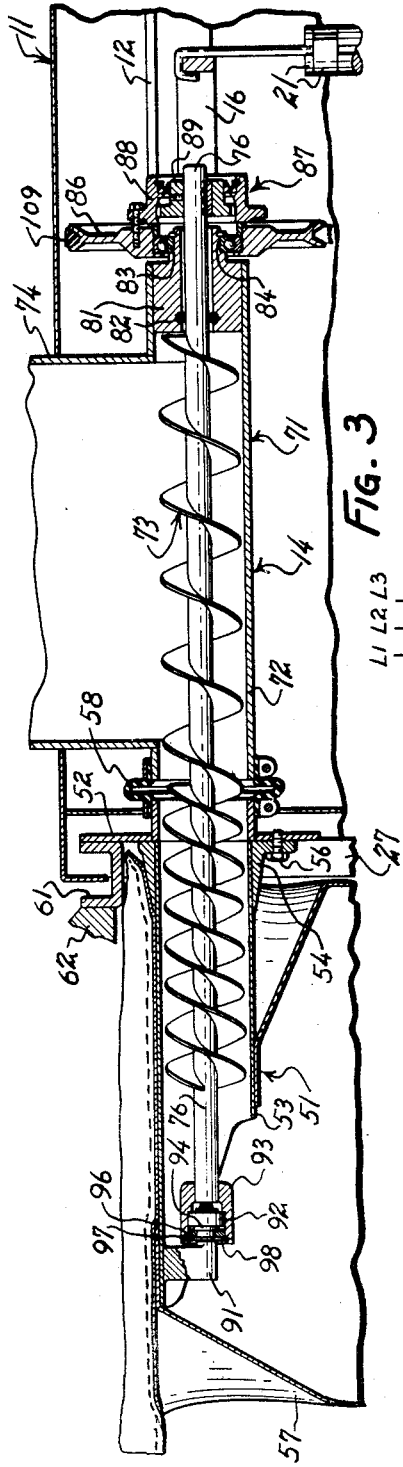
Figure 3 is a detail view, partly in cross section, of the screw assembly taken along line 3—3 of Figure 2.
Figure 5:
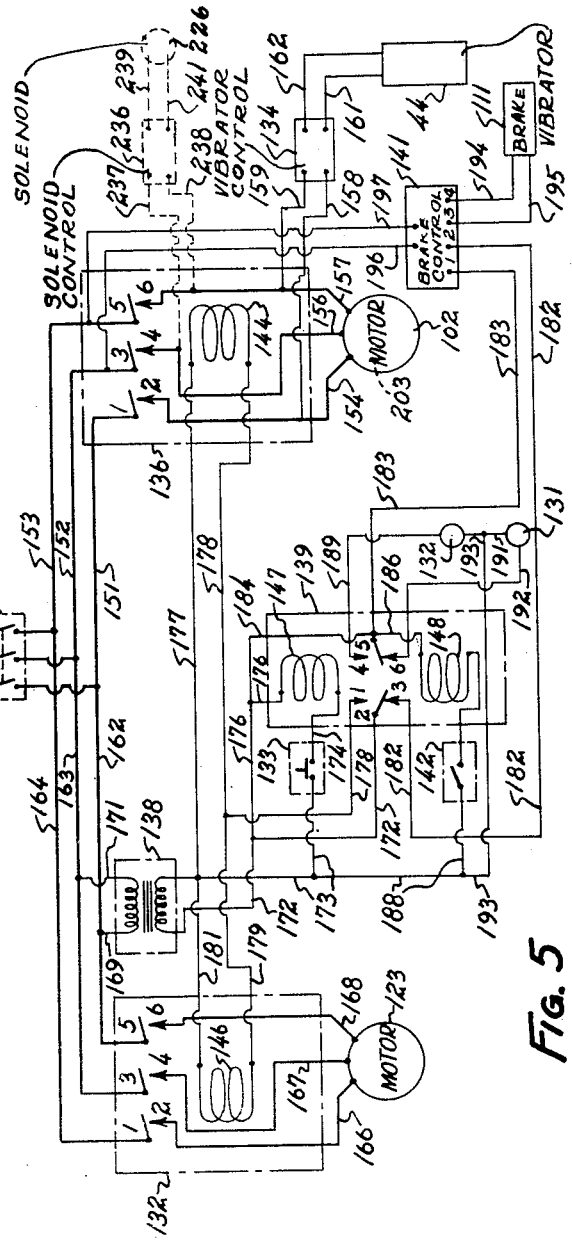
Figure 5 is a circuit diagram schematically illustrating certain portions of the apparatus together with the electrical connections.

The circuit diagram of Figure 5 includes the power supply lines L1, L2 and L3 which may be the standard 220 volt three phase 60 cycle A.-C. One side of switch 129 is connected to lines L1, L2 and L3 and the other side of switch 129 is connected to movable contacts 1, 3 and 5 of motor control assembly 136 by conductors 151, 152 and 153. Stationary contacts 2, 4 and 6 of motor control assembly 136 are connected to motor 102 by conductors 154, 156 and 157. Conductors 154 and 157 are connected to the input terminals of vibrator control 134 by conductors 158 and 159. The output terminals of the vibrator control are connected to the vibrator 44 by conductors 161 and 162.

Movable contacts 1, 3 and 5 of motor control assembly 137 are connected to conductors 151, 152 and 153 by conductors 162, 163 and 164. Stationary contacts 2, 4 and 6 of motor control assembly 137 are connected to gearmotor 123 by conductors 166, 167 and 168.

The primary winding of coil 138 is connected to conductors 162 and 163 by conductors 169 and 171. One side of the secondary winding of transformer 138 is connected to movable contact 2 of relay assembly 139 by conductor 172 and the other side of the secondary winding is connected to one side of start button 133 by conductor 173. The other side of start button 133 is connected to coil 147 by conductor 174 and the other side of coil 147 is connected to conductor 172 by conductor 176. Conductor 173 is connected to one side of coil 144 by conductor 177 and the other side of coil 144 is connected to stationary contact 1 of relay assembly 139 by conductor 178. Conductor 178 is connected to one side of coil 146 by conductor 179 and the other side of coil 146 is connected to conductor 173 by conductor 181.

Stationary contact 3 of the relay assembly 139 is connected to terminal 2 of brake control assembly 141 by conductor 182 and terminal 1 of the brake control assembly is connected to movable contact 5 of relay assembly 139 by conductor 183. Conductor 183 is connected to conductor 176 by conductor 184. Conductor 183 is also connected to one side of coil 148 by conductor 186 and coil 148 is connected to one side of switch 142 by conductor 187. The other side of switch 142 is connected to conductor 173 by conductor 188.

Stationary contact 4 of relay assembly 139 is connected to one side of lamp 132 of the conductor 189 and the other side of lamp 132 is connected to one side of lamp 131 by conductor 191. The other side of lamp 131 is connected to stationary contact 6 of relay assembly 139 by conductor 192. Conductor 191 is connected to conductor 188 by conductor 193.

Control terminals 3 and 4 of brake control assembly 141 are connected to the brake 111 by conductors 194 and 195. The input terminals of brake control assembly 141 are connected to conductors 152 and 153 by conductors 196 and 197.

Operation of the embodiment of my bag filling and weighing apparatus as shown in Figures 1 through 5 can now be reviewed as follows: Switch 129 is first thrown to the "on" position and if the apparatus is working properly, lamp 131 will be lighted. This circuit is completed from one side of the secondary winding of the transformer 138, which is energized on closing of switch 129, to conductor 172, conductor 176, conductor 184, contacts 5 and 6 of relay assembly 139, conductor 192, lamp 131, conductor 191, conductor 193, conductor 188, conductor 173 to the other side of the secondary winding. Lighting of lamp 131 indicates that the apparatus is ready for a bag filling operation. A bag of the valve type such as is shown at 57 is inserted over spout 53 and in such a manner that the top seam of the bag rests on the top of the spout and the bottom seam of the bag rests in the bag saddle substantially as shown by the dotted lines in Figure 4. The bag is then clamped in position by movement of the top end of lever 66 to the left as viewed in Figure 1.

Now, assuming that housing 116 is connected to a suitable supply of material with which it is desired to fill the bag, push button 133 is operated which causes energization of motor 102 and gearmotor 123. Motor 102 is operated by closing contacts 1 to 6 of motor control assembly 136 and gearmotor 123 is operated by closing of contacts 1 through 6 of motor control assembly 137. These two sets of contacts are closed by energization of coils 144 and 146 through operation of push button 133, which energizes coil 147. Push button 133 is of the momentary contact type and hence coil 147 will be de-energized as soon as button 133 is released. However contacts 1 and 2 and 4 and 5 of relay assembly 139 are held in a closed position by spring latch (not shown).

Energization of coil 147 closes contacts 1 and 2 and 4 and 5 of relay assembly 139 which causes energization of coils 144 and 146. Coil 144 is energized by a circuit completed from one side of the secondary winding of transformer 138 through conductor 172, contacts 1 and 2 of relay assembly 139, conductor 178, coil 144, conductor 177, to the other side of the secondary winding. The circuit for energizing coil 146 is completed from one side of the secondary winding of transformer 138 through conductor 172, contacts 1 and 2 of relay assembly 139, conductor 178, conductor 179, coil 146, conductor 181 to the other side of the secondary winding.

At the same time motor 102 is energized, brake 111 is de-energized by opening of contacts 5 and 6 of relay assembly 139 which are in its control circuit. This control circuit is completed from control contact 1 of brake assembly 141, through conductor 183, conductor 184, conductor 176, conductor 172, contacts 2 and 3 of relay assembly 139, conductor 182, to control contact 2 of brake control assembly 141. Thus, it is apparent that as soon as motor 102 is energized, brake 111 is de-energized, and when motor 102 is de-energized, brake 111 will be energized.

At the same time contacts 1 and 2 of relay assembly 139 are closed, contacts 4 and 5 of relay assembly 139 are also closed causing lamp 132 to light. This circuit is completed from one side of the secondary winding of transformer 138 to conductor 172, conductor 176, conductor 184, contacts 4 and 5 of relay assembly 139, conductor 189, lamp 132, conductor 193, conductor 188, conductor 173, to the other side of the secondary winding. Lighting of lamp 132 indicates that the apparatus is operating properly and will stay lit until the bag is filled as hereinafter described.

Operation of gearmotor 123 causes operation of paddle wheel 117 which serves to control the rate of speed to feed screw 73. As pointed out previously, this type of feed control is only required for materials having a tendency to bridge within the chute 74.

As the material is fed down into chute 74, it is discharged through spout 53 by feed screw 73 into the bag carried on the spout.

The saddle shoes 41 have been so curved and spaced that the bottom of the bag will be filled in such a manner that the side gussets of the bag are opened, thus causing the bottom portion of the bag to be filled properly. However, for certain aerated materials, it has been found that operation of vibrator 44 is required in order to obtain the proper filling of the bag. The vibrator 44 is connected in parallel with conductors 154 and 157 which lead to motor 102 and hence vibrator 44 is energized at the same time that motor 102 is energized.

As the bag continues to fill, the weight of the material in the bag will rest primarily upon the bag saddle and thus will prevent straining the spout 53. The weight of the material in the bag acting on spout 53 and the bag saddle assembly 32 pivots scale beam 16 at 17 and when the bag has been filled with the predetermined amount of material, the scale beam will come in contact with the operating member switch 142 and close the contacts of the same.

The closing of switch 142 energizes coil 148 which kicks out the spring latch causing opening of contacts 1 and 2 and 4 and 5 and closing of contacts 2 and 3 and 5 and 6. The circuit energizing coil 148 is completed from one side of the secondary winding of transformer 138 through conductor 172, conductor 176, conductor 184, conductor 186, conductor 148, conductor 187, switch 142, conductor 188, conductor 173 to the other side of the secondary winding. Opening of contacts 1 and 2 of the relay assembly 139 de-energizes motor 102 and gear motor 123. Opening of contacts 4 and 5 of relay assembly 139 de-energizes lamp 132 and closing of contacts 5 and 6 energizes lamp 131. Closing of contacts 1 and 2 of relay assembly 139 energizes the brake 44.

After motor 102 and gearmotor 123 have been de-energized, the bag may be removed from the spout and the bag saddle. The saddle shoes 41 pivot forwardly as shown in Figure 1 and facilitate removal of the bag by allowing the bag to slide off of the saddle assembly.

If it is desired to check the weight of the material in the bag, the bag may be weighed on a suitable scale. If the weight is incorrect, the quantity of material to be delivered into the bag can be changed merely by adding or subtracting poises 21 and then getting a fine adjustment by moving trim weight 22 by rotating hand wheel 26.

It will be noted that the spout 53 and the bag saddle assembly 32 are fixed to a parallelogram-like assembly which is comprised of the cabinet 11, links 28, bars 27 and scale beam 16. Thus, as the weight of the material in the bag causes the scale beam to pivot about point 17, the spout 53 and the bag saddle assembly 32 will move downwardly in a horizontal plane. Downward movement of spout 53 in a horizontal plane causes pivoting of feed screw 73 about gear coupling 87. As hereinbefore described, gear coupling 87 is of the type which will allow deflection of this type. The ball bearing assembly 92 at the forward end of the feed screw is of the self-aligning type and will not be affected adversely by this deflection. The flexible coupling 58 permits the movement of spout 53 relative to casing 72.

It should be appreciated that the downward movement of spout 53 is not very great, and hence at no time will the feed screw 73 rub or bind against the side walls of the casing 72.

As pointed out previously, the forward end of feed screw 73 is provided with a flight in the form of a double helix. This double helix prevents an undue amount of material from flowing from the spout 53 after motor 102 has been stopped. It is apparent that the greater the width between the adjacent surfaces of the helix, the greater will be the amount of material which will flow into the bag after the rotation of feed screw 73 has stopped. Thus, the addition of a flight in the form of a double helix increases the accuracy of my bag filling and weighing apparatus.

The speed of rotation of feed screw 73 may be varied by raising and lowering motor 102 by rotating hand wheel 107 in a manner previously described.

The bag saddle assembly 32 may be spaced at any desired distance from spout 53 merely by loosening bolts 34 to accommodate various sizes of bags.

An additional advantage of my bag filling and weighing apparatus is that the feed screw 73 can be easily cleaned. It is merely necessary to remove bolts 56 from the collar 54 after which the spout 53 together with the feed screw 73 may be removed from the casing 72.

Another embodiment of my bag filling and weighing apparatus is shown in Figures 6 through 9. A considerable portion of this embodiment of my apparatus is identical to the embodiment of my apparatus shown in Figs. 1 to 5 previously described. Therefore, I will only describe those portions which differ from those shown in Figures 1 through 5.

In place of screw assembly 71, I have provided an impeller assembly 201 which consists of a mounting plate 202 fixed to the side walls of the cabinet 11. A vertical totally enclosed motor 203 is carried by mounting plate 202 and serves to drive an impeller 204 mounted on the output shaft 206 of the motor. A disc-type brake 111 identical to the type used on motor 102 is mounted on output shaft 206.

The impeller 204 consists of hub 207 which is provided with a suitable number of blades 208 such as three. The top portion 208a of each blade 208 is curved forwardly in the direction of rotation and serves to scoop up the material as it descends through a cylindrical chute 209 mounted over impeller 204. Each of the blades is bent slightly counterclockwise, as viewed in Figure 7, from the point of attachment of the blade to the hub 207. Shaping the blades in this manner causes the impeller to discharge the material tangentially through an opening 211. A passageway 212 is fixed to chute 209 at opening 211 and is connected to spout 53 by flexible coupling 58.

In certain instances where my apparatus is used for packaging of free flowing materials such as diatomaceous earth, I have found it desirable to provide means for closing a passageway 212 to prevent the free flowing material from flushing out through spout 53. Any suitable means may be provided for closing passageway 212 when impeller 204 is stopped for rotating. One means I have found to be satisfactory consists of a rotary valve assembly 216 of the ported plug type.

The valve assembly 216 is comprised of a body 218 formed of a cylindrical member 219 mounted in passageway 212 intermediate the ends thereof in such a manner that the axis of the cylindrical member 219 is at right angles to the axis of passageway 212. A pair of end plates 221 are fastened over the open ends of cylindrical member 219 by bolts 222. A cylindrical plug 223 is coaxially aligned within cylindrical member 219 and has end shafts 224 which are journalled in plates 221. The lower end shaft 224 is connected to a rotary solenoid 226 of the type manufactured by G. H. Leland Company, Inc., of Dayton 2, Ohio.

The rotary solenoid is mounted on suitable supporting framework and is provided with a cover 227 to inhibit the entrance of dust and the like into its working parts. The connection between the lower end shaft 224 and the rotary solenoid is made by a member 228 which loosely engages a pin 229 adapted to be rotated by rotary solenoid 226. A lever 331 is also fixed to lower end shaft 224 and is connected to a spring 232 which has its other end connected to the cabinet at 233. The spring 232 serves to continuously urge the ported plug 223 toward a closed position. The ported plug 223 is rotated through 90° by the rotary solenoid 226. Pin 229 actually rotates through 95° but 5° are taken up in lost motion between pin 229 and member 228. A substantial clearance has been provided between the ported plug 223 and the cylindrical member 219 so that the ported plug 223 can be easily rotated at all times.

The embodiment of my bag filling and weighing apparatus shown in Figures 6 through 9 is not provided with a feed control assembly as is the embodiment of my apparatus shown in Figures 1 through 5. However, if it is found that the material being fed through chute 209 has a tendency to bridge, a feed control assembly may be provided.

The circuit diagram for connecting the electrical components in the embodiment of my invention shown in Figures 6 through 9 is very similar to that shown in Figure 5. However, motor control assembly 137 and its associated connections is not required since the feed control assembly has been omitted. The rotary solenoid 226 is provided with a solenoid control 236 and both have been shown in dotted lines in Figure 5. The input terminals of solenoid control 236 are connected to conductors 156 and 159 by conductors 237 and 238 and the output terminals of the solenoid control have been connected to the rotary solenoid 226 by conductors 239 and 241. Motor 203 is substituted for motor 102 and is also indicated by dotted lines. It is apparent from the above connections that the rotary solenoid 226 is connected in parallel with motor 203 and will be de-energized when motor 203 is de-energized.

The operation of the bag filling and weighing apparatus shown in this embodiment of my invention is very similar to that previously described. As soon as switch 109 has been thrown to the "on" position and push button 133 has been operated, motor 203 will drive impeller 204 to discharge material through spout 53 into a bag or like container in a manner previously described. At the same time the motor 203 is energized, rotary solenoid 226 is energized, moving the ported plug 223 to the open position to allow the material to be discharged therethrough. As soon as the bag has been filled with the predetermined amount of material, scale beam 16 will operate switch 142 de-energizing motor 203 and rotary solenoid 226. At the moment rotary solenoid 226 is being energized, spring 232 swings the ported plug towards the closed position to prevent the discharge of additional material through spout 53. Thus, it is apparent that free flowing materials such as diatomaceous earth cannot pass through spout 53 after motor 203 has been de-energized.

Brake 111 is energized at the same time that motor 203 is de-energized and hence immediately stops rotation of the impeller 204 to prevent the discharge of material after the scale beam has operated switch 142.

It is apparent from the foregoing that I have provided bag filling and weighing apparatus which is capable of rapid and successive operation with minimum weight variation between bags. The apparatus may be used with various sizes of bags and the pivoted saddle shoes facilitate the easy handling of the larger bags. Spillage and flushing have been reduced to a minimum by the use of solenoid operated valves and double flight screws.

I claim:

1. In an apparatus for filling and weighing bags and like containers, a supporting framework, a scale beam pivotally mounted on said framework, an outlet spout mounted on the front end of said scale beam and movable with the scale beam, said spout being adapted to be inserted into a bag placed thereon, a counterbalance on said scale beam, feed means mounted on said framework for discharging material through a discharge opening in substantial axial alignment with said spout, flexible means connecting the discharge opening to said spout to permit movement of said spout relative to said feed means, means for pivotally connecting said spout to said frame whereby said spout will move rectilinearly in a downward direction as the material is being discharged into the bag being filled, and means actuated by movement of said scale beam for automatically stopping the operation of said feeding means.

2. In an apparatus for filling and weighing bags and like containers, a supporting framework, a scale beam pivotally mounted on said framework, an outlet spout mounted on the front end of said scale beam and movable with said scale beam, said spout being adapted to be inserted into a bag placed thereon, a counterbalance on said scale beam, feed means mounted in said framework for discharging material through a discharge opening in substantial alignment with said spout, flexible means connecting the discharge opening to said spout to permit movement of said spout relative to said feed means, parallelogram means pivotally connected to said scale beam, spout, and supporting framework to cause said spout to move rectilinearly as said spout moves downwardly as material is discharged through the spout into the bag supported by the spout, and means actuated by movement of said scale beam when a predetermined amount of material has been discharged through said spout into said bag for automatically stopping the operation of said feed means.

3. Apparatus as in claim 2 together with a bag saddle pivotally mounted on said parallelogram means below said spout, said bag saddle being adjustable vertically with respect to said spout and being adapted to engage the bottom of a bag carried by the spout to support a substantial portion of the weight of the material in the bag as the bag is being filled, the forward end of said bag saddle being tiltable downwardly about the pivot for the saddle to facilitate removal of filled bags from the apparatus.

4. Apparatus as in claim 1 wherein said feed means includes a casing mounted on said framework, a feed screw within said casing and having one end extending into said spout, and means for journalling said feed screw in said framework and said spout to accommodate the rectilinear movement of said spout, one end of said screw moving with said spout and the other end remaining stationary with said framework.

5. Apparatus as in claim 4 wherein said feed screw includes a shaft, a single flight on the rear portion of said shaft and a double flight on the forward portion of said shaft to reduce spillage and flushing from the spout when the feed screw is stationary.

6. In an apparatus for filling and weighing bags and like containers, a supporting framework, a scale beam pivotally mounted on said framework, an outlet spout mounted on the end of said scale beam and movable with said scale beam, said spout being adapted to be inserted into a bag being placed thereon, a counterbalance on the other end of said scale beam, a feed chute mounted on said frame, a casing mounted on said framework and having an opening extending into said chute, flexible means for connecting said casing to said spout to permit movement of said spout relative to said casing, a feed screw within said casing and extending into said spout, said feed screw including a shaft and a helical flight mounted on said shaft, means for journalling the front end of said shaft to said spout, means for journalling the rear end of said shaft to the framework, and drive means connected to the rear journalling means for rotating said shaft, said journalling means and said drive means accommodating the movement of said spout relative to said casing as it moves downwardly as the bag supported thereon is being filled, and means actuated by movement of said scale beam for automatically stopping the operation of said drive means.

7. Apparatus as in claim 6 together with feed control means mounted on said chute to prevent bridging of materials within said chute, said feed control means comprising a housing mounted on said chute, a paddle wheel mounted in said housing, and drive means for rotating said paddle wheel at a predetermined speed.

8. Apparatus as in claim 6 wherein the forward portion of said feed screw is provided with a double flight to reduce spillage and flushing from the spout when rotation of said feed screw has been stopped.

9. In apparatus for filling and weighing bags and like containers, a supporting framework, a scale beam pivotally mounted on said framework, an outlet spout mounted on the end of said scale beam and movable with said scale beam, said spout being adapted to be inserted in a bag being placed thereon, a counterbalance on the other end of said scale beam, a feed chute mounted on said framework, a casing mounted on said framework and having an opening extending into said chute, flexible means for connecting said casing to said spout to permit movement of said spout relative to said casing, a feed screw within said casing and extending into said spout, said feed screw including a shaft and a helical flight mounted on said shaft, means for journalling the front end of said shaft to said spout and for journalling the rear end of said shaft to said framework, and drive means connected to the rear journalling means for rotating said shaft, the journalling means and the drive means accommodating the movement of said spout relative to said casing as it moves downwardly during filling of the bags, said drive means comprising a platform having one end pivoted to said framework, an electric motor mounted on said platform, said electric motor having a pair of output shafts, an electric brake mounted on one output shaft, a spring loaded pulley mounted on the other output shaft, a sheave mounted on the rear journalling means, a belt connecting said pulley to said sheave, and means for raising and lowering the unpivoted end of said platform to vary the speed of rotation of said sheave, and means actuated by movement of said scale beam for automatically stopping operation of said drive means.

10. In apparatus for filling and weighing bags and like containers, a supporting framework, a scale beam pivotally mounted on said framework, an outlet spout mounted on one end of said scale beam and movable with said scale beam, said spout being adapted to be inserted into a bag placed thereon, a counterbalance on said beam, a chute having a discharge opening mounted on said frame, an impeller mounted in said chute for discharging material from said chute through said discharge opening, drive means connected to said impeller, a passageway having one end connected to said discharge opening in said chute, a flexible coupling connecting the other end of said passageway to said spout to allow downward movement of said spout with respect to said passageway as material is discharged through the spout into a bag supported thereon, and means actuated by movement of said scale beam when a predetermined amount of material has been discharged into the bag for automatically stopping the operation of said impeller.

11. Apparatus as in claim 10 together with a flow control valve mounted in said passageway, said valve means being closed when said drive means is de-energized.

12. Apparatus as in claim 10 together with valve means mounted in said passageway, said valve means comprising a valve body having inlet and outlet flow passages connected into said passageway, a plug rotatably mounted in said valve body, said plug having a port therethrough having a diameter substantially equal to the diameter of said passageway, spring means for rotating said plug to a closed position to prevent a discharge of material through said passageway when said drive means is not operating, solenoid operated means for rotating said plug to an open position to permit the passage of material therethrough, and means for energizing said solenoid when said drive means is operating.

13. Apparatus as in claim 10 wherein said impeller is provided with blades which are bent in a direction opposite to the direction of rotation, said blades having an upper portion curved forwardly in the direction of rotation.

14. In apparatus for filling and weighing bags and like containers, a supporting framework, scale means pivotally mounted on said framework, an outlet spout mounted on one end of said scale beam and movable with said scale beam, said spout being adapted to be inserted into a bag placed thereon, a counterbalance on said beam, a chute mounted on said frame and having a discharge opening, an impeller mounted in said chute for discharging material from said chute through said discharge opening, drive means connected to said impeller, means including a flexible coupling connecting the discharge end of said chute to said spout to permit movement of said spout relative to said chute, and means actuated by movement of said scale beam for automatically stopping operation of said impeller.

15. Apparatus as in claim 14 together with a flow control valve mounted in the means for connecting the discharge opening of said chute to said spout, means yieldably urging said valve toward a closed position, and means operated when said drive means is operated to move said valve to an open position.

References Cited in the file of this patent

UNITED STATES PATENTS

| Re. 22,434 | Allen | Feb. 15, 1944 |
| 373,199 | Schledin | Nov. 15, 1887 |
| 619,834 | Nickerson | Feb. 21, 1899 |
| 1,001,562 | Smith | Aug. 22, 1911 |
| 2,232,437 | Bushman | Feb. 18, 1941 |
| 2,293,518 | Moyle | Aug. 18, 1942 |
| 2,436,983 | Vredenburg | Mar. 2, 1948 |
| 2,613,053 | Dorrington et al. | Oct. 7, 1952 |
| 2,624,539 | Hartman et al. | Jan. 6, 1953 |

FOREIGN PATENTS

| 454,579 | Canada | Feb. 15, 1949 |
| 1,047,771 | France | July 29, 1953 |